J. T. CADENHEAD.
DEMOUNTABLE RIM.
APPLICATION FILED JUNE 12, 1920.
1,378,764.
Patented May 17, 1921
2 SHEETS—SHEET 1.
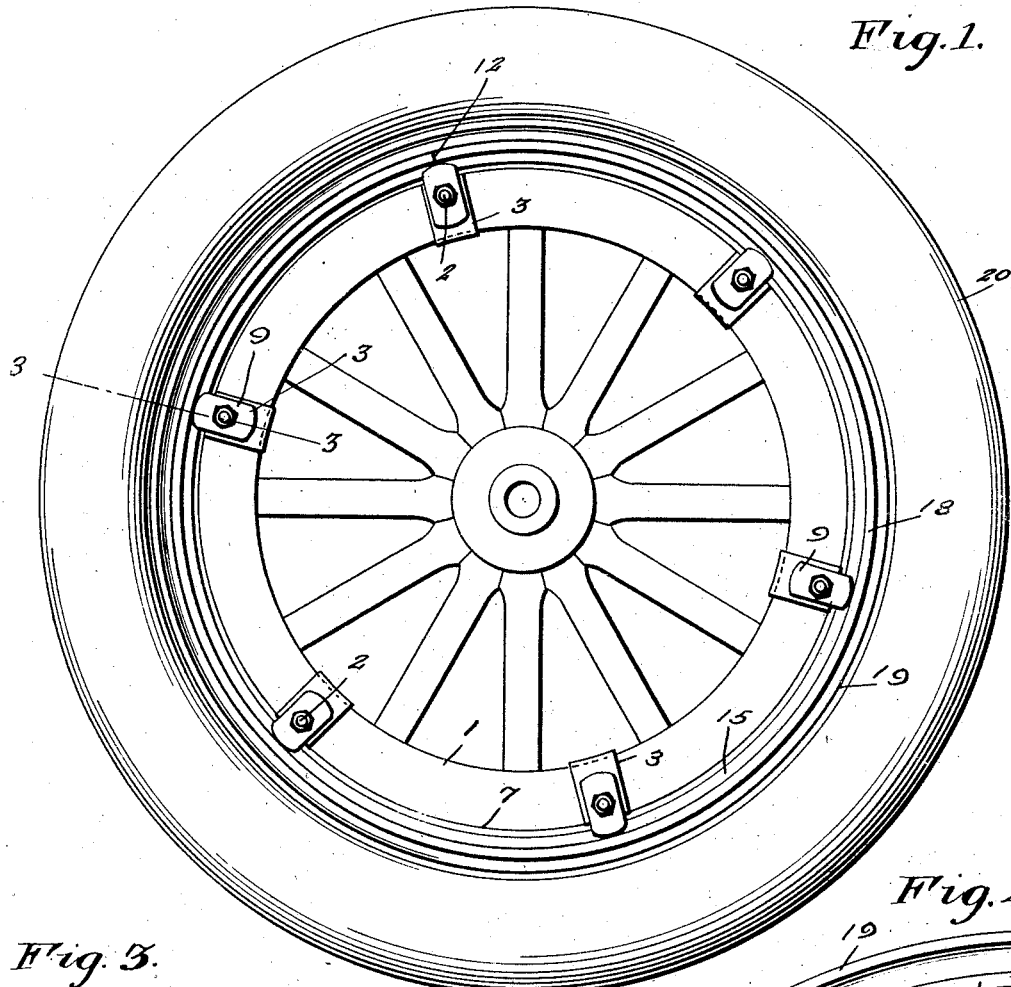
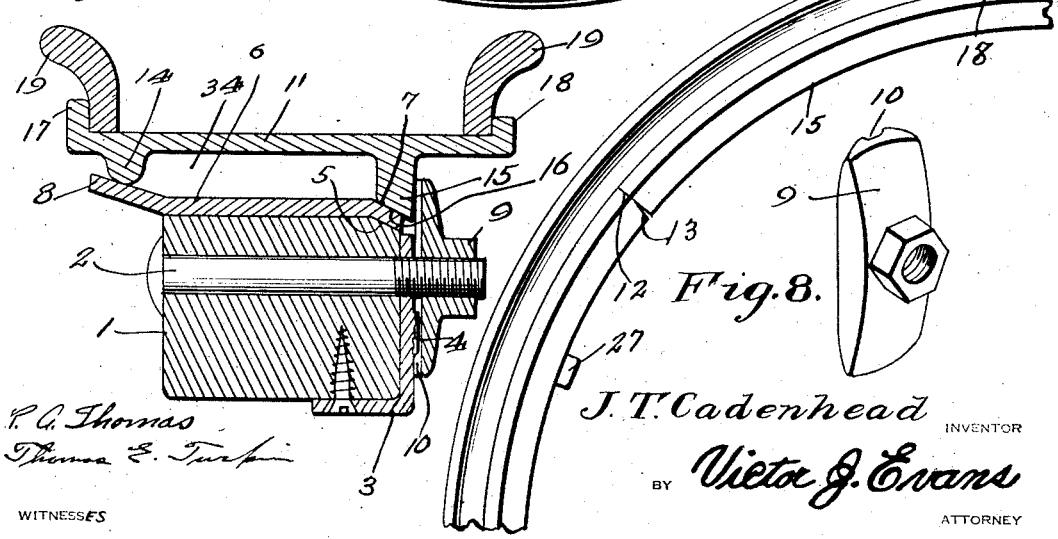
J. T. Cadenhead INVENTOR
BY Victor J. Evans ATTORNEY

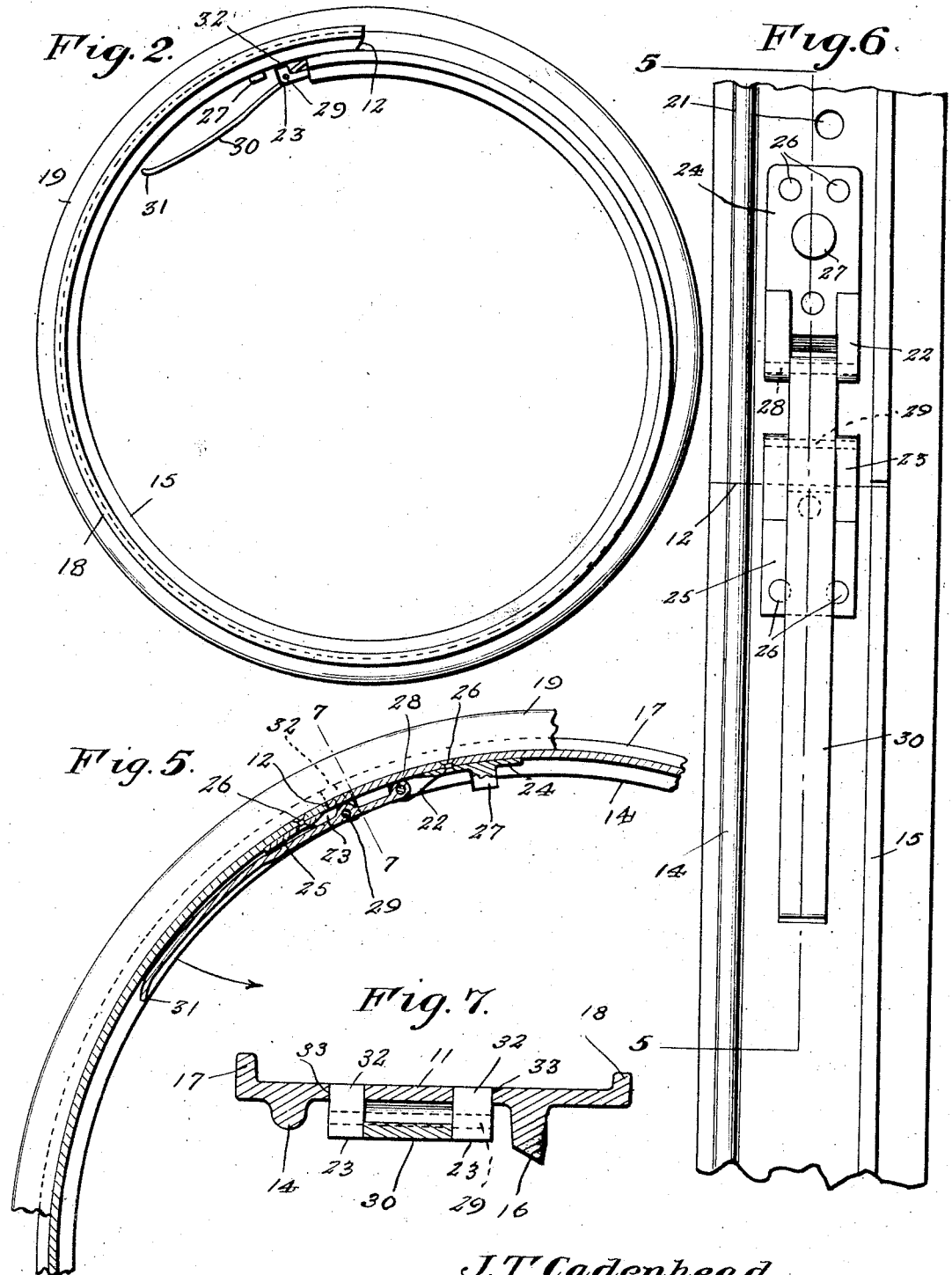

UNITED STATES PATENT OFFICE.

JOHN T. CADENHEAD, OF ENSLEY, ALABAMA.

DEMOUNTABLE RIM.

1,378,764. Specification of Letters Patent. Patented May 17, 1921.

Application filed June 12, 1920. Serial No. 388,615.

*To all whom it may concern:*

Be it known that I, JOHN T. CADENHEAD, a citizen of the United States, residing at Ensley, in the county of Jefferson and State of Alabama, have invented new and useful Improvements in Demountable Rims, of which the following is a specification.

The object of my present invention is the provision of a demountable rim construction that is, at once, simple and strong, susceptible of ready manipulation, compact, and reliable and safe.

To the attainment of the foregoing the invention consists in the improvement as hereinafter described and definitely claimed.

In the accompanying drawings, hereby made a part hereof:—

Figure 1 is a side elevation illustrating an automobile wheel embodying my novel rim construction.

Fig. 2 is a side elevation of the rim *per se* in its contracted state.

Fig. 3 is a section with the tire omitted, said section being taken in the plane indicated by the line 3—3 of Fig. 1 and being of an enlarged scale.

Fig. 4 is a fragmentary side elevation showing the meeting ends of the rim and also showing one of the rings on the rim.

Fig. 5 is a detail longitudinal section taken in the plane indicated by the line 5—5 of Fig. 6.

Fig. 6 is a detail view of the inner side of the rim showing the means whereby the ends of the rim are locked in abutting relation.

Fig. 7 is a transverse section taken in the plane indicated by the line 7—7 of Fig. 5.

Fig. 8 is an enlarged perspective of one of the rim lugs.

Similar numerals of reference designate corresponding parts in all of the views of the drawings.

In furtherance of my invention I provide the felly 1 of a wheel with threaded transverse bolts 2 and with wear plates 3, each of said wear plates having on its face a radially disposed rib 4. I also provide the felly 1 at its outermost corner with a bevel 5 that extends entirely around the felly. In association with the felly 1 I employ a metallic felly band 6 having the outer angularly-disposed edge portion 7 and an inner angularly-disposed edge portion 8, said portion 8 being projected beyond the inner side of the felly as best shown in Fig. 3. Also in association with the felly 1 I employ rim lugs 9 each of which is threaded on one bolt 2 and is provided in its working side with a groove 10. When each lug 9 is in working position as shown in Fig. 3 its groove 10 receives the rib 4 on the wear plate 3 with the result that casual turning movement of the lug 9 is precluded and yet when subjected to stress the lug may be turned on the bolt to a position at right angles to that shown in Fig. 3.

By comparison of Figs. 3 to 7 it will be noted that the rim 11 is split at 12 and that one of the abutting ends is beveled as indicated by 13, Fig. 4. It will also be noted that extending throughout the length of the rim 11 at the inner side thereof are spaced and parallel ribs 14 and 15; the rib 14 being rounded in cross section to ride to position on the edge portion 8 of the felly band 6, and the rib 15 being deeper than the rib 14 in about the proportion illustrated and being provided with a beveled surface 16 to conform to the edge portion 7 of the felly band 6. At its outer side the rim 11 is provided with inner and outer marginal flanges 17 and 18 to engage rings 19 for retaining a tire 20 on the rim, and I would here have it understood that the flange 17 is proportionately deep. The practical advantage of this will be readily understood when it is stated that when the rim in contracted state is laid on the flange 17, the said flange 17 will preclude disassociation of the rings 19 from the rim. Thus after being laid on the flange 17 raising of the rim will be attended by raising of the rings 18 on the rim without liability of either of said rings 19 being disassociated from the rim. In addition to the features mentioned the rim is provided with an aperture 21 for the passage of a valve stem and is also provided at its inner side adjacent to its abutting ends with pairs of lugs numbered 22 and 23, respectively; the said pairs of lugs 22 and 23 being preferably, though not necessarily, carried by plates 24 and 25, riveted at 26 to the rim. I also provide the rim with a stud 27 to enter a socket in the felly band 8 with a view to preventing creeping of the rim on said band, and when the plate 24 is employed I prefer that the stud 27 be carried by said plate as illustrated. Pivoted at 28 between the lugs 22 and at 29 between the lugs 23 is a lever 30 for use in contracting the rim, in expanding the rim and in locking the rim in expanded state with its ends abutting as appears in Figs. 4 and 5. The said lever 30 is curved in the direction of its length in conformity to the curvature of the rim, and its free end is slightly defected as indicated by 31 in Fig. 5 so that it may be readily grasped for manipulation. Manifestly the lever 30 when positioned as shown in Fig. 5 is in a dead center and therefore there is no liability whatever of the ends of the rim casually moving out of their abutting relation. When, however, it is desired to contract the rim as appears in Fig. 2 the same may be accomplished by the expenditure of little effort in moving the lever 31 in the direction indicated by the arrow in Fig. 5. Again through the medium of the lever and by movement of the same in reversed direction the ends of the rim may be expeditiously and easily moved into their abutting relation when they will be locked in such relation as before described. The lugs 23 are provided as best shown in Figs. 5 and 7 with studs 32 which are complementary to apertures 33 in the end portion of the rim by which the lugs 22 are carried. In consequence of this when the lever 30 is moved into the position shown in Fig. 5 the studs 32 will enter the apertures 33 and will thereby assist very materially in the locking or securing of the ends of the rim in the abutting relation.

By particular reference to Fig. 3 it will be observed that a considerable space 34 is afforded between the felly band 6 and the rim 11. The said space 34 serves to accommodate and to house the lever 30 and this without distortion whatever of the rim 11 or the felly band 6. In this connection it will be noticed that tight joints are formed between the rib 14 and 15, on the one hand, and the angularly-disposed edge portions of the felly band, on the other with the result that moisture and dust will be effectively prevented from gaining access to the lever 30. From this it follows that when the rim 11 is slipped outwardly and off the felly band 6, the lever 30 will always be found to be in a good workable condition.

By virtue of the ribs 14 and 15 on the rim 11 being disposed at the edge portions 7 and 8 of the felly band 6, the said ribs 14 and 15 will, incidental to outward movement of the rim on the felly band, find tight seats on the said edge portions 7 and 8 of the felly band to promote the dust and moisture excluding purpose before alluded to as well as to seat the rim 11 solidly on the felly band.

Having described my invention, what I claim and desire to secure by Letters Patent, is:—

1. The combination with a split contractible and expansible rim having lugs at the inner sides of its end portions and a stud on one lug and an aperture in the other end portion to receive said stud, of a lever pivotally connected with said lugs.

2. The combination with a split contractible and expansible rim having lugs at the inner sides of its end portions and a stud on one lug and an aperture in the other end portion to receive said stud, of a lever pivotally connected with said lugs; said lever being curved in conformity to the curvature of the rim and being arranged to rest in a dead center when the ends of the rim are in abutting relation.

In testimony whereof I affix my signature.

JOHN T. CADENHEAD.